Sept. 1, 1931.   H. SHAMP   1,821,673
METHOD AND APPARATUS FOR TREATING FIBER BEARING PLANTS
Filed May 8, 1929   4 Sheets-Sheet 3

INVENTOR
HERBERT SHAMP
BY
ATTORNEYS

Sept. 1, 1931.   H. SHAMP   1,821,673
METHOD AND APPARATUS FOR TREATING FIBER BEARING PLANTS
Filed May 8, 1929   4 Sheets-Sheet 4

INVENTOR
HERBERT SHAMP
BY
ATTORNEYS

Patented Sept. 1, 1931

1,821,673

UNITED STATES PATENT OFFICE

HERBERT SHAMP, OF MEMPHIS, TENNESSEE

METHOD AND APPARATUS FOR TREATING FIBER-BEARING PLANTS

Application filed May 8, 1929. Serial No. 361,408.

This invention relates to improvements in methods and apparatus for treating fiber-bearing plants, and particularly to a continuous method for decorticating and degumming certain fibrous plants, such as Sotol Nolina, Agave Lechuquilla, Yucca grass, fibrous portions of plants of the genus Yucca, including the leaves of the Joshua tree, and other fibrous material of this nature. Most of the plants referred to have fiber-bearing leaves of a substantial size, containing from thirty to thirty-five per cent of fiber imbedded in a saponaceous gum.

An object of the present invention is to provide for an improved, continuous treatment of fiber-bearing leaves and plants, and the processing thereof continuously from the natural state, to a form suitable for the manufacture of certain textiles.

A further object is to provide, in conjunction with a continuous retting process, an improved means for separating the gum and any accompanying woody matter from the fiber, at or about the time of completing the retting process. It will be understood that the fiber-bearing material is retted to soften the gums and fiber, to render the fiber more easily separable, and to impart the desired working qualities to the fiber for the ensuing steps of treatment.

A further object of the present invention is attained in an arrangement of apparatus identified with the several steps of the process, such that the course of material through and between the several items of apparatus is effected with a minimum of attention and manual labor.

Still a further object is attained in the provision of combined means of novel type, for handling the fiber-bearing material in and from that part of the apparatus which is devoted to retting, and for mechanically separating the fiber from the accompanying gums and other material, as it is being removed from the retting process.

Figure 1:
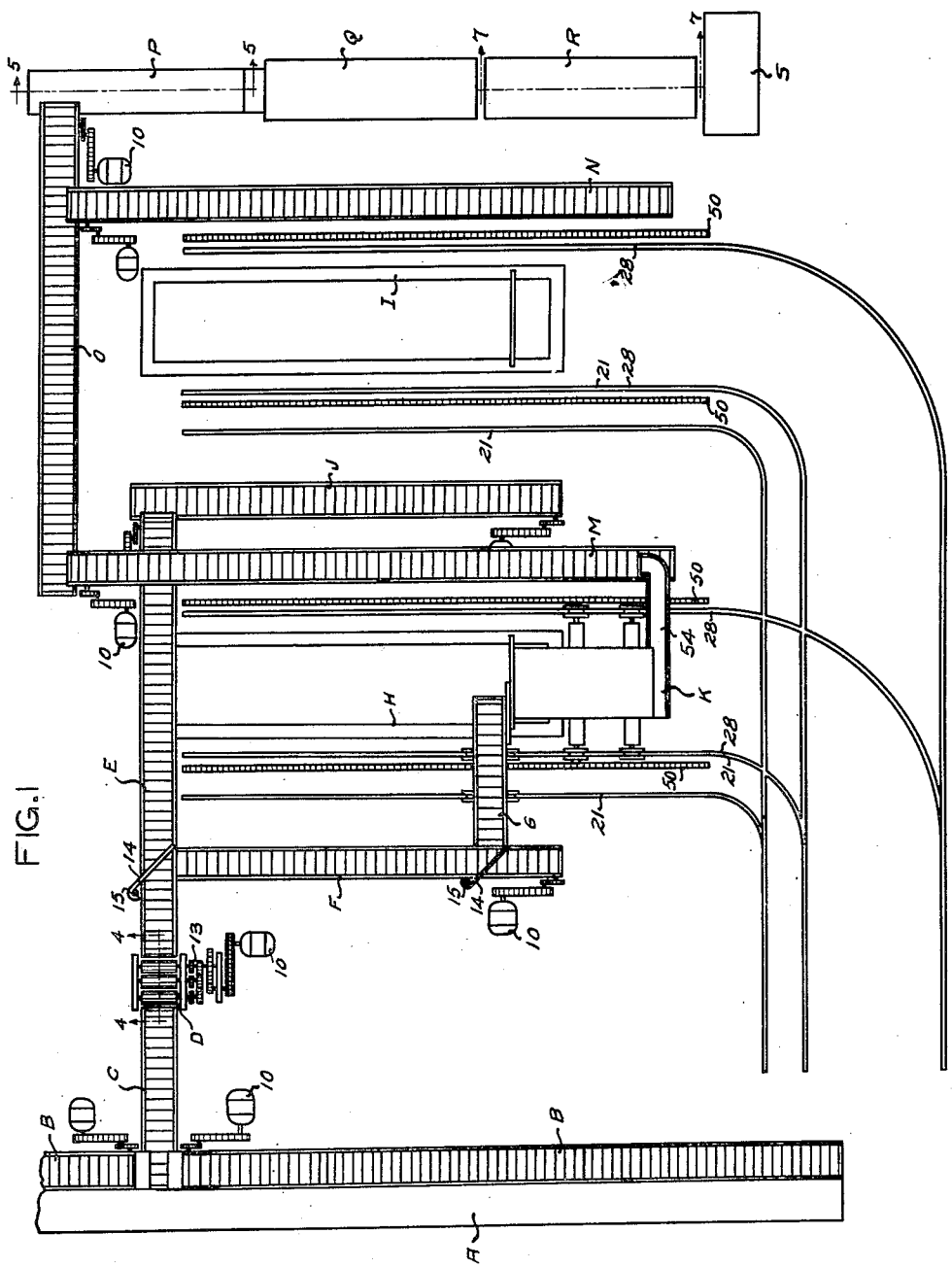
Figure 2:
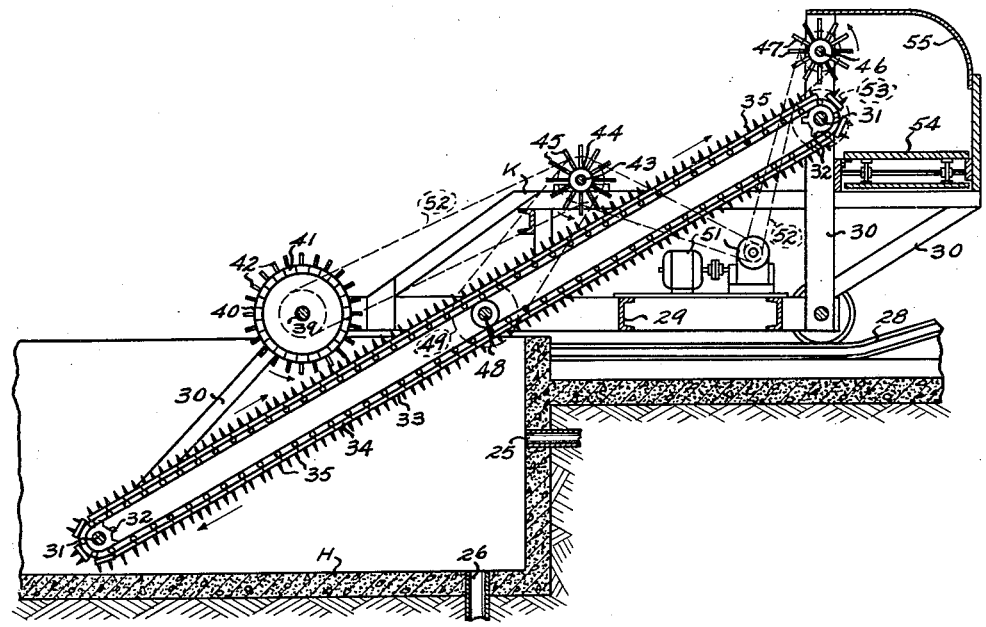
Figure 3:
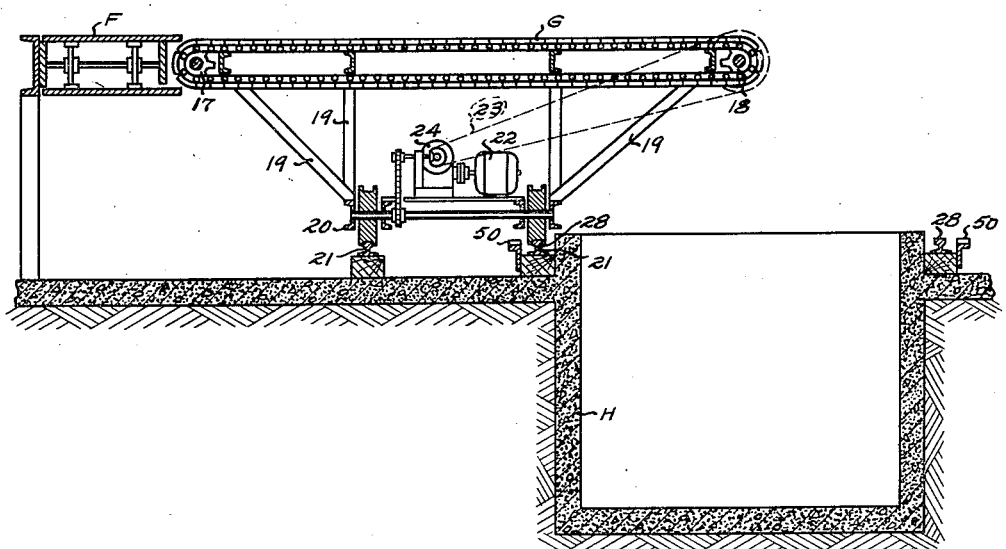
Figure 4:
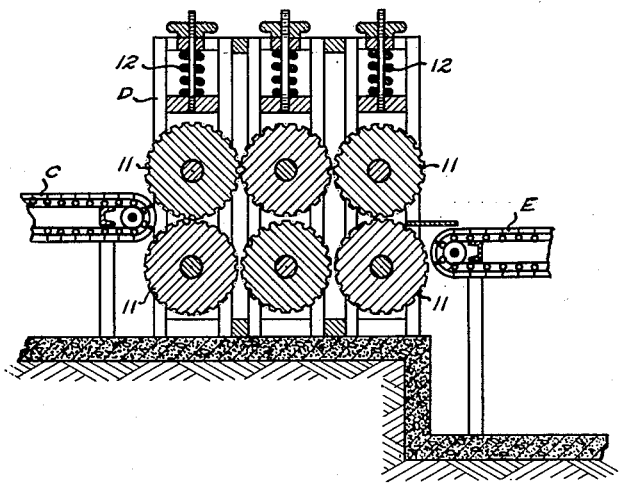
Figure 5:
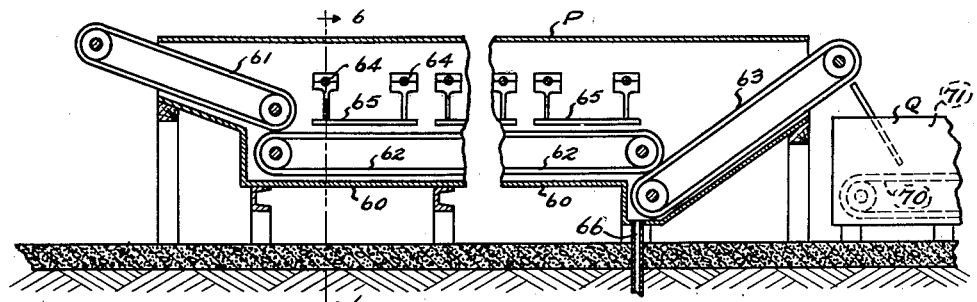
Figure 7:
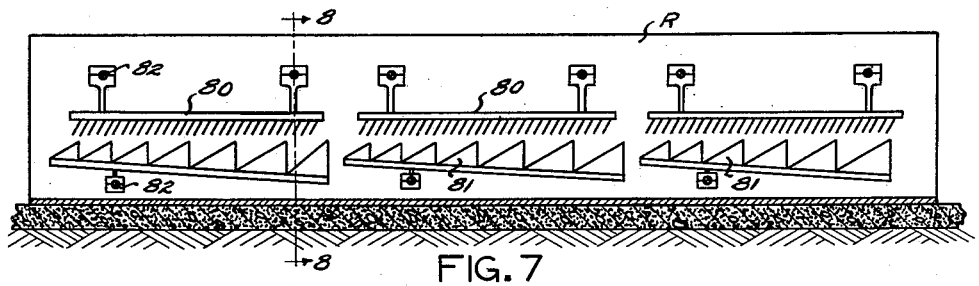
Figure 6:
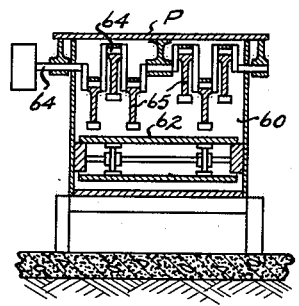
Figure 8:
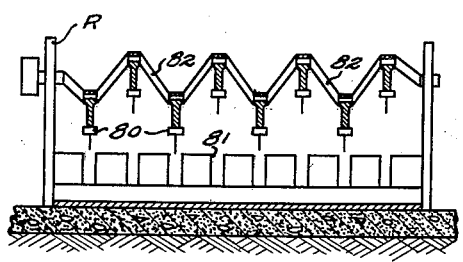
Figure 9:
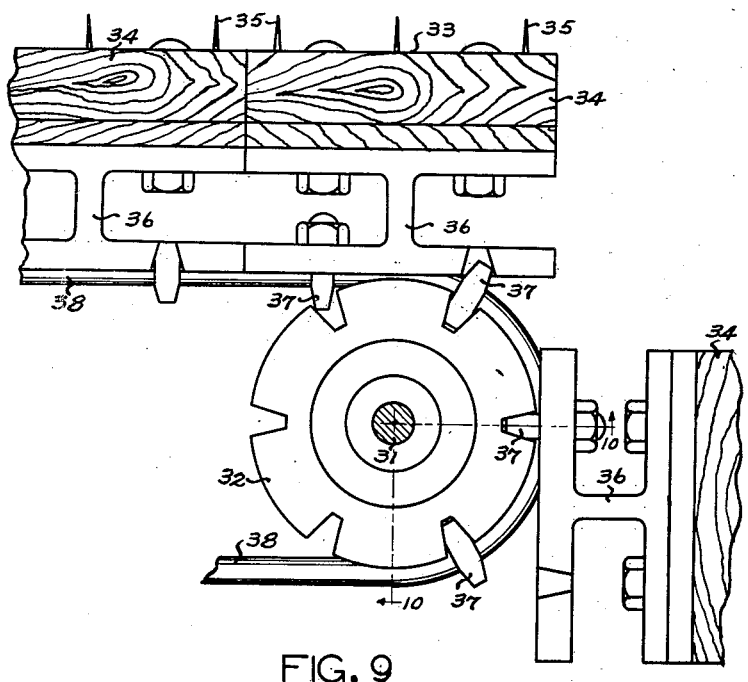
Figure 10:
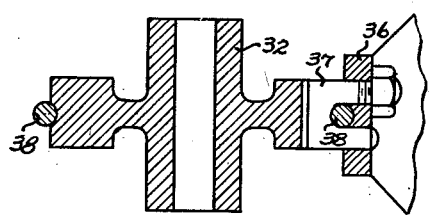

Further objects and advantages of the invention will appear in the course of the description, and from the accompanying drawings forming a part of this specification, and in which Fig. 1 is a plan, showing, schematically, a preferred arrangement of the several items of equipment constructed and disposed according to the present invention; Fig. 2 is a side elevation, partly in section, of a preferred form of a combined decorticating and conveying apparatus; Fig. 3 is a side elevation, partly in section, of a movable transfer conveyor employed in connection with the retting equipment; Fig. 4 is a vertical sectional elevation of a crushing mill, taken along line 4—4 of Fig. 1; Fig. 5 is a partly diagrammatic, longitudinal section of the washer, taken along line 5—5 of Fig. 1; Fig. 6 is a diagrammatic sectional elevation on line 6—6 of Fig. 5; Fig. 7 is a diagrammatic longitudinal section through the shaker, along line 7—7 of Fig. 1; Fig. 8 is a diagrammatic section on line 8—8 of Fig. 7; Fig. 9 is an elevation showing certain details of construction of the decorticating conveyor, and Fig. 10 is a section along line 10—10 of Fig. 9.

It will be understood that the following description relates specifically to certain apparatus, and the method or process employed therewith, as representing the presently preferred embodiment of the invention, but that the ensuing detailed description is to be considered in an illustrative, rather than in a limiting sense, since obvious changes may be made in the kind of apparatus employed, in i s arrangement, in the sequence of steps involved and in the combinations of the various apparatus, without departing from the spirit and full intended scope of the invention as defined by the appended claims.

Referring now by reference characters to the drawings, it will be seen from Fig. 1 that the raw fiber-bearing material, such as the leaves or plants to be treated are receivable in a hopper or the like A, adjacent which is one or a plurality of conveyors B, arranged to deliver the materials as by means of a conveyor C, to a breaker or crusher mill D. These and other items of apparatus will be described in detail, following the present general description of the various items of apparatus and their preferred relation for treating the fibrous material by the method to be described.

The material crushed in the mill D is discharged upon a conveyor E, whence it is moved onto a conveyor F, thence by a movable transfer conveyor G and discharged into a retting tank H, of which there may be any desired plurality, and a substantial duplicate of which appears at I. It will be noted that conveyor E is preferably of such a length that it is adapted to supply each of the retting tanks, delivery being effected therefrom to a chosen tank-loading conveyor, such as F, by means of baffles or deflectors, removably disposed across the line of movement of the material. A tank loading conveyor J is employed, similarly to F, for supplying material to the tank I. It will be understood that the number of retting tanks and extent of the conveying equipment employed therewith may be increased as may be required and desired, according to the capacity of the remaining equipment; the number and capacity of the tanks being, by preference, such that the retted material may be removed from the tanks in quantities commensurate with that supplied, whereby to maintain the plant, as a whole, in continuous operation.

As will hereinafter be more specifically described, there is provided in connection with each of the retting tanks H, I, a conveyor such as K, movably disposed on suitable tracks adjacent the tanks, whereby to be moved along, and partly within the tanks; or as may be desired, to be moved also between the several retting tanks. The device K includes means for physically separating the fiber from the accompanying gums and any woody material therewith, such means being for the present identified as the rotating members in the upper portion of Fig. 2, these being in the nature of decorticating and scutching rolls. For purposes of the present description the term "decorticating" is used to denote the physical separation of the fiber from accompanying foreign substance, and includes a treatment in th nature of scutching. It will be understood that, as the material issues from the decorticating device K, the fiber is practically entirely physically separated from the accompanying detritus.

The device K being movable, delivery of the decorticated fibrous mass is effected at any point along any of the outloading tank conveyors such as M, N, thence to a conveyor O, and is directed into a washer P, (Figs. 1 and 5). In the washer, the fiber is agitated in a liquid bath, with or without exposing it to chemical action, and the last traces of foreign material removed from the fiber, which is thence discharged to a dryer Q, for removal of moisture.

The dryer Q may consist of a conveyor, such as an apron conveyor, traveling continuously and slowly through a heated enclosure, at such a rate that, upon issuing from the dryer, the fiber is practically free of moisture.

At this state of the process it will be understood that the fiber is physically separated and removed from practically all of the original accompanying gums and woody material. However, to insure that any fragments of undesired substances are removed from the fiber before putting it on the market, the fiber is conveyed from the dryer into a suitable shaker R (Figs. 1, 7 and 8), where it is subjected to a more or less violent agitation, during which the last traces of unwanted particles are shaken from the fiber, and the individual fibers of the mass are loosened from each other in a manner to produce a soft, pliable and homogeneous product now ready for the market. If, as is preferred, the fiber is to be marketed in the form of bales, it may be conveyed from the shaker to a suitable baling apparatus, such as S, a number of which are well known in the art and need not be here described in detail, since the baling apparatus per se forms no part of the present invention.

Proceeding now to a more detailed description of the several items of apparatus preferably employed in carrying out the invention, it may be noted that the conveyors of fixed location, such as B, C, E, F, etc., may be of the endless, slat type, and each is preferably individually driven by a motor drive unit 10, which includes a suitable speed reduction gear. The provision of individual drive units for the several conveyors affords the facility of better speed regulation through the various stages or steps of the process.

The mill D, in which the fibrous material is first processed, preferably consists of a plurality of fluted rolls 11, (Fig. 4) three such pair being shown. As a means of regulating the pressure between the respective pairs of rolls, springs 12 may be provided to secure an adjustable crushing pressure. By preference, the rolls are gear driven, as by a train of gears 13, (Fig. 1), the gears thereof being provided with long teeth in order to permit of a substantial degree of adjustment between the paired rolls.

Upon issuing from the crusher rolls of the mill D, at some suitable point on the conveyor E, the material encounters one of a series of deflectors 14, which may be hinged as at 15 to a vertical support or pivot to permit their being swung to an out-of-action position beyond the conveyor, and adjusted as to height. Any suitable number of the deflectors 14 may be provided and disposed at points in the conveying system where it may be desired to change the direction of travel of the material through the system.

From Figs. 1 and 3 will be seen the arrangement and construction of a transfer conveyor hereinbefore designated as G, which consists in the present example, of a substantially horizontal slat-type conveying apron, rotatable about gears 17 and 18 which may be in turn secured on suitable frame members 19 of a carriage 20. The carriage 20 is in turn adapted to be moved along a track 21, and propelled by a motor or equivalent drive unit 22, which may serve, through the chain or belt 23 and a suitable reduction gear 24, to actuate the conveyor. It will be understood that the transferring conveyor is of itself, in the nature of an automotive device and is movable along the track 21 to distribute the fibrous material evenly along the retting tanks. As indicated above, in the general description of the method, any desired plurality of the retting tanks may be employed, and consequently any desired plurality of the transfer conveyors. It is, however, preferred that the conveyor trackage 21 be arranged in communicating manner adjacent all the different tanks of a given system, whereby the same transfer conveyor may serve a number of retting tanks without the necessity of duplicating this equipment.

The process of retting, as applied, say to the treatment of Yucca grass and the like, serves the purpose of rendering the fiber more easily separable from the accompanying gums and tissues. The process of retting as heretofore generally practiced, is carried on in the open, after curing or immediately after gathering or harvesting the fiber-bearing material in the green state. The material as thus treated in the open is usually not of a uniform condition, and such material has been shown by experience to result in intermittent operation of the fiber recovering means employed therewith. By employing the present process and apparatus, retting and treatment of the fiber bearing plants may be carried on throughout the year, without regard for season, and results in a more uniform fiber of better working qualities and strength.

For present purposes of description of the retting tanks, such as H and I, they may be described as of water tight construction, and may be, as shown, formed of concrete or the like, and partly disposed below the working level of the mill or plant. A suitable inlet and outlet 25 and 26, respectively, (Fig. 2), serve as conduits through which a retting liquor may be periodically withdrawn and subjected to treatment to increase the desirable bacterial content, and thereafter returned to the tanks.

As a means of handling the retting material out of the tanks such as H and I, I provide, by preference, one or any desired plurality of the conveyors K, each mounted upon and supported by an automotive carriage arranged to move along the tracks 28. Conveyor K is constructed on a frame 29, upon which are projecting end members 30, one shown as extending above the frame 29 and outside of the tank, the other extending below the frame and into the tank. Each of these end members serves as a bearing support for a shaft 31, upon which are mounted the related end gears 32 which serve as the rotating and driving elements for an endless, slat type conveyor 33, extending therebetween and into the tank, preferably substantially to the lowest level thereof. The conveyor 33 includes a number of individual lagging elements 34 (Fig. 9), each of which is provided with a plurality of substantially aligned, outwardly projecting pin elements or teeth 35 for a purpose hereinafter appearing. The lagging portions 34 may be constructed of heavy oak or the like, and each bolted in turn to one or more lagging supports 36, each of the last mentioned pieces being secured as by a U clamp 37, in gripping relation with a flexible cable 38 extending around and over each of the end gears 32, by which the cable is positioned and rotated. It will be noted that the clamps 37 serve in the nature of gear teeth to effect a positive operative connection between the cable and the conveyor. It will further appear from Fig. 9, that two types of the clamps 37 are employed; certain of the clamps extending through and bolted onto the supports 36, while the alternate clamps are secured only to the cable. This arrangement insures a flexibility of connection between the cable and conveyor, and yet maintains these parts in predetermined relation.

Near the upper and inner portion of frame 29, a shaft 39 is supported in suitable bearings and upon which is rotatably mounted a cylinder 40, the periphery of which is provided with lagging 41, disposed lengthwise of the cylinder. The lagging 41 may be of a construction similar to the lagging 34 and is likewise provided with outwardly projecting steel pins 42. The pins 42, like the spikes or teeth 35, are tapered outwardly and pointed. The cylinder 40 is so disposed with respect to the conveyor 34 that the steel pins 42 and 35 respectively, will overlap or be interleaved to a certain extent, for a purpose hereinafter appearing.

Substantially intermediately of the frame 29, and carried thereby, is a shaft 43 carrying a cylinder 44, the periphery of which is, like cylinder 40, provided with a plurality of steel pins 45, bearing a relation to the conveyor 33 similar to that of the cylinder 40.

Disposed at the outer and upper portion of frame 29, and pivotally mounted thereon, as by a shaft 46, is a steel brush 47. This brush is, by preference, disposed immediately adjacent the outer end of conveyor 33, as will appear from Fig. 2.

As heretofore mentioned, the conveyor apparatus K, is self-propelled and adapted to be moved, as a whole, along one or more of the retting tanks. To this end a propeller shaft 48 is provided, upon this shaft being mounted a driving gear 49, (shown diagrammatically in Fig. 2), the teeth of which are adapted to mesh with a rack 50, (Figs. 1 and 3), disposed along and adjacent the retting tanks with which the conveyor K is to be employed. The location of rack 50 will best appear from Fig. 1.

As a means for actuating the conveyor 33, the cylinders 40, 44 and the brush 47, I provide a power unit consisting, preferably, of a motor connected to a suitable reduction gear, the power unit being indicated generally at 51. From the driving element of the power unit, belts, chains, or any usual equivalent thereof, such as 52, may extend respectively to a driving gear 53 for actuating the conveyor 33, to a suitable gear on the shaft 46, for actuating the brush 47 and in like manner respectively to the shafts 43, 39, 48, etc. It will be understood, of course, that clutches (not shown) of any suitable type may be provided as desired in connection with the gearing associated with each of the aforementioned shafts, and particularly in connection with the conveyor propeller shaft 48 to enable the propulsion of the apparatus K at the will of the operator.

For receiving the separated and decorticated fiber as it issues from the conveyor 33, it is preferred to provide a conveyor 54, which, as will be seen from Fig. 1, serves to deliver the fiber directly to one of the outloading conveyors from the retting tanks, and thence to the conveyor O, whence it is directed to the washer P.

The operation of the apparatus K may be briefly reviewed for the sake of completeness of description. The pins 35, carried by the lagging 34 of the conveyor 33, serve to pick up the decorticated fiber from the retting tanks into which the conveyor extends. These pins have a direct action on the fiber as it is removed from the tank, serving to separate and comb the fiber and to cause it to lie in parallel strands along the upper surface of the upwardly traveling portion of the conveyor. The cylinder 40, being disposed at or about the top of the tank, and provided with lagging and pins as described, is caused to move with a surface velocity slightly in excess of that of the conveyor 33. The action of cylinder 40 is to comb and separate the material near the top of the tank, which may not be so completely retted as the material in the lower levels of the tank. As the fibrous material is carried upwardly and outwardly on the conveyor, the cylinder 44, preferably somewhat smaller in diameter than cylinder 40, serves further to separate the fiber from the accompanying undesirable material, and to distribute the fiber on the conveyor. The cylinder 44 is rotated at a somewhat lower surface speed than that of the conveyor, in order to effect such distribution of the fiber. The steel brush 47 disposed at the upper and outer end of the conveyor is operated at comparatively high speed, and serves as a doffer to remove the fiber from the pins on the conveyor and to deposit it, in turn, on the conveyor 54, whence it proceeds, as described, to the conveyor O. In order to confine the fiber under the action of the rapidly revolving brush 47, and to insure the deposit of all the fiber onto the conveyor 54, I prefer to provide a hood 55 (Fig. 2), which may be carried by the frame 29, and so movable along with the apparatus K.

For the purpose of enabling the conveying apparatus K to be moved, not only lengthwise of a given tank, but between the several tanks, such as H and I, so as to enable the use of a single apparatus K to serve any required plurality of the retting tanks, it is preferred that the conveyor tracks 28 be elevated adjacent the ends of the tanks and therebetween (see Fig. 2), in order to provide a working clearance for the depending portions of the apparatus when removed from the tank.

After being discharged from the apparatus K in the manner heretofore described, the fiber proceeds to the washer P, which consists, essentially, of a tank or other suitable container 60, which may be of any suitable construction, and lengthwise of which there is disposed one or any desired plurality of conveyors 61, 62 and 63, which may be of apron type. As may be desired, a suitable level of liquid may be maintained in the washer, say to a height somewhat above the conveyor 62. The apron conveyors cause the material to proceed somewhat slowly through the washer, during which time the fiber and liquid therewith is subjected to an agitating action by a plurality of rotating crank shafts 64, to the crank throws of which are dependingly pivoted a plurality of beaters 65, which may be perforated, and are alternately lifted and lowered at a rapid rate, with the effect of washing the last traces of gum and foreign matter from the fiber on the conveyor 62. Any suitable means (not shown), for supplying fluid, may be employed in connection with the tank 60. For either continuous or intermittent drainage, it is preferred to provide a drain or discharge pipe, such as 66.

The outgoing apron conveyor 63 delivers the fiber, now in a thoroughly washed state, but, of course, heavily charged with the liquid from the washer, into the dryer, which may be of any suitable or usual type for such purposes. Upon reaching the dryer, the fiber is deposited on an apron conveyor such as 70, and is caused thereby to proceed slowly through the drying enclosure 71, which may be supplied with heated air from any suitable source (not shown). The conveyor 70 then delivers the fiber into the shaker, comprising one or a series of shaker elements 80, which serve to advance the fiber along a plurality of stepped oscillating trays 81. Suitable cranks, such as 82, may be employed for imparting the desired oscillating or jigging motion to the elements 80 and 81. The purpose of the shaker is to eliminate any lumpiness or undue compactness of the fiber, and mechanically to shake therefrom any possibly remaining traces of gums or woody material. The oscillating movement of the shaker elements 80 and 81 is such as to advance the fiber through the shaker without the aid of auxiliary conveyors or the like. The fiber as it issues from the shaker is entirely clean, of good color, soft, pliable and of good working qualities ready for carding, spinning or any other subsequent operation to which it may be subjected in the manufacture of textile products.

It will be seen from the described provision for tank-retting, that this portion of the method renders it independent of seasonal and weather variations, and hence, with the other features described, enables the fiber recovery to be conducted without interruption. By employing the described method and apparatus, a dependably uniform product is obtained, and by the described method of decorticating, the gums and woody matters are removed from the retted material without injury to the fiber thereof. The employment of adequate conveying equipment and the minimizing of manual labor, enables the complete processing of fibers, such as the fiber of Yucca grass, at a cost far below the prevailing figures for like products.

I claim as my invention:

1. The herein described method of recovering a textile fiber, which consists in substantially immersing the fiber bearing substance in a retting medium, in mechanically handling such substance out of the medium, and in decorticating the fiber while still containing a substantial amount of the retting medium.

2. The herein described method of recovering a textile fiber, which consists in employing a retting liquid, and in decorticating the fiber in the presence of the retting liquid, and substantially within and adjacent to a container for such liquid.

3. The herein described method of recovering a textile fiber, which consists in retting the fiber bearing substance in a liquid medium, and in decorticating the fiber substantially concurrently with its removal from the retting liquid.

4. The herein described method of recovering a textile fiber which consists in subjecting the fiber-bearing substance to a combined retting and decorticating process in the presence of a retting liquid, in mechanically handling the substance out of the retting liquid substantially concurrently with the decorticating process, and in washing and drying the decorticated fiber.

5. The herein described method of recovering a textile fiber which consists in mechanically reducing the fiber-bearing substance to a uniform mass, in retting the fibrous mass by a wet process, in mechanically separating the retted fiber in advance of any additional treatment thereof, and in cleansing the separated fiber.

6. The herein described method of recovering a textile fiber which consists in crushing the fiber bearing substance, in retting the crushed substance, in decorticating the fiber substantially upon completion of the retting thereof, and in advance of any further treatment of the fiber, and in cleansing the decorticated fiber.

7. The herein described method of recovering a textile fiber which consists in milling the fiber-bearing substance, in subjecting the substance to a substantially continuous retting process, in mechanically separating the retted fiber in the presence of the retting medium as it is removed therefrom, and in cleansing the separated fiber.

8. The herein described method of recovering a textile fiber, which consists in milling the fiber-bearing substance, in tank-retting the milled fiber by a continuous process, in decorticating the retted fiber in the presence of an appreciable amount of the retting medium, and while moving it out of the retting tank, in washing and drying the fiber, and in agitating the fiber.

9. The method of recovering the fiber from Yucca grass and the like, for textile purposes, which comprises the steps of retting the grass in a liquid container, in mechanically handling the grass out of the container, and during such movement substantially separating the fiber from the grass in the presence of the retting medium and in cleansing the separated fiber.

10. In apparatus for recovering a textile fiber, a retting container, and means disposed partly within said container, for substantially separating the fiber from accompanying foreign matter.

11. In apparatus for recovering a textile fiber, a retting container, and rotating members for decorticating the fiber, one of said members extending into said container.

12. Apparatus for recovering a textile fiber, including a container for retting liquid, and combined means for handling the fiber-bearing substance in the container and for separating the fiber from associated foreign matter.

13. Apparatus for recovering a textile fiber including a container for retting liquid, a plurality of rotating members adapted to coact to separate the fiber from accompanying substances, and means carried by one of said members for removing the fiber bearing substance from said container.

14. In combination with means for recovering textile fibers, an automotive decorticating device.

15. Apparatus for recovering a textile fiber, including a tank for subjecting the fiber-bearing substance to a liquid treatment, and a mechanical fiber-separating device, extending into, and movable relatively to said tank.

16. In apparatus for recovering a textile fiber, a container for subjecting the fiber-bearing substance to a liquid treatment, combined means extending substantially into, and movable along said container, adapted for decorticating the fiber and conveying it from the container, a washer, and means for conveying the fiber to the washer.

17. In apparatus for recovering a textile fiber, a plurality of rolling members, a container for subjecting the fiber bearing substance to a liquid treatment, combined means for decorticating the fiber and conveying it from the container, a washer, a dryer, and means for conveying the substance to be treated between said rolling members, container and washer.

18. In apparatus for recovering a textile fiber, the combination of a mill, a retting container, combined means including a mobile conveyor extending into the container for decorticating the fiber and conveying it from the container, a washer, a dryer, an agitator, and means for conveying the fibrous material between said items of apparatus.

19. In a device for decorticating vegetable fiber for textile purposes, the combination, with a retting vat, of a carriage arranged for rolling movement with respect to said vat, a conveyor mounted on said carriage and adapted to extend into said vat, a plurality of fiber-handling pins, or spikes, carried exteriorly by said conveyor, a rotatable element disposed adjacent one side of said conveyor and having exterior projections, a driving unit for said conveyor and rotatable element, mounted on the carriage, and means for propelling said carriage by said driving unit.

20. In a device for decorticating a vegetable, textile fiber, the combination, with a retting vat, of a carriage arranged to be moved with respect to said vat, an elevating conveyor mounted on said carriage and adapted to extend into said vat, a plurality of projections extending exteriorly of said conveyor, a drum, or roll having projections thereon and adapted to coact with said conveyor to decorticate the fiber upon its removal from the vat, a second roll disposed beyond the first mentioned roll, an auxiliary conveyor mounted on said carriage, a power unit on the carriage, means connecting the power unit for operating said conveyor and rolls, and means for propelling said carriage by said power unit.

HERBERT SHAMP.